United States Patent [19]

Jansen et al.

[11] Patent Number: 5,705,535
[45] Date of Patent: Jan. 6, 1998

[54] METHOD FOR THE SUBCRITICAL DRYING OF AEROGELS

[75] Inventors: Rolf-Michael Jansen, Kelkheim; Birgit Kessler; Johann Wonner, both of Frankfurt am Main; Andreas Zimmermann, Griesheim, all of Germany

[73] Assignee: Hoechst Aktiengesellschaft, Frankfurt, Germany

[21] Appl. No.: 535,234
[22] PCT Filed: May 4, 1994
[86] PCT No.: PCT/EP94/01413
§ 371 Date: Oct. 27, 1995
§ 102(e) Date: Oct. 27, 1995
[87] PCT Pub. No.: WO94/26406
PCT Pub. Date: Nov. 24, 1994

[30] Foreign Application Priority Data

May 18, 1993 [DE] Germany ............ 43 16 540.0

[51] Int. Cl.⁶ ........................................... C08J 9/28
[52] U.S. Cl. ............ 521/64; 252/315.6; 252/315.7; 423/338; 521/180; 521/181; 521/187; 521/188; 521/915
[58] Field of Search ................... 521/180, 181, 521/187, 188, 915

[56] References Cited

U.S. PATENT DOCUMENTS 4,190,457  2/1980  McDaniel.
4,970,397  11/1990  Green et al..
5,081,163  1/1992  Pekala.

FOREIGN PATENT DOCUMENTS 1 189 052  6/1985  Canada.
0 171 722  2/1986  European Pat. Off..

OTHER PUBLICATIONS

Chemical Abstracts, vol. 80, No. 10, 11 Mar. 1974, Columbus, Ohio; Abstract No. 52623b, Butsko 'Effect of an electric field on silica gel structure'.

*Primary Examiner*—Morton Foelak
*Attorney, Agent, or Firm*—Curtis, Morris & Safford, P.C.

[57] ABSTRACT

Process for the preparation of aerogels by subcritical drying of inorganic and organic hydrogels and lyogels to give aerogels, dielectric drying methods being used.

4 Claims, No Drawings

METHOD FOR THE SUBCRITICAL DRYING OF AEROGELS

A "sol" is taken to mean a colloidal, liquid system in which the dispersed particles (size 1 to 1000 nm) are either solids or macromolecules.

A "gel" is a colloidal system having solid character in which the colloidal constituents form a continuous (interpenetrating) network in a dispersing medium whose kinetics are slower than those of the colloidal constituents. The dispersed constituents are held together by covalent bonds, hydrogen bonds, dipole forces, van der Waals forces and/or by mechanical intertwining.

The gels are subdivided with respect to their dispersing medium (water, alcohol, organic solvents, air) into hydrogels for water, alkogels for alcohol, lyogels for organic solvents and aerogels for air.

If air is contained as a dispersant, the gels are additionally differentiated according to the type of drying/preparation:

Xerogel

If the gel liquid was removed by simple drying, forming a liquid/vapor interface, the dried gel is termed a "xerogel".

Aerogel

If the gel liquid was removed above its critical point and pressure (supercritical conditions), the dried gel is termed an "aerogel". Because of the supercritical conditions, no interface is formed.

Cryogel

If the liquid was removed by freeze drying, the dried product is termed a "cryogel". Here, the solid/gas interface is overcome by sublimation.

Hereafter, aerogels are also taken to mean xerogels and cryogels in accordance with the above definition.

Generally, aerogels are highly porous materials made of silica or metal oxide which are distinguished by particularly low densities of 20 to 300 kg/m$^3$ with extremely high internal surface areas of over 1000 m$^2$/g. Because of these properties, aerogels are outstandingly suitable as heat insulators, sound insulators, catalyst supports and as adsorbents.

Aerogels can be prepared according to the prior art by two different routes via a sol-gel process with subsequent supercritical drying.

In the Kistler method (S. S. Kistler, J. Phys. Chem. 36 (1932), pp. 52 to 64), water glass is used as starting material. Acidifying water glass with HCl or $H_2SO_4$ produces a silica hydrogel which is then freed of alkali metal ions by washing them out with water. Water contained in the hydrogel is then completely exchanged in one step for 95% pure alcohol (ethanol, methanol). The resulting alkogel is then dried supercritically in an autoclave.

Since the drying of alkogels requires high temperatures and high pressures, a drying method was developed from $CO_2$ [EP 171 722], the organic solvent being exchanged for $CO_2$ prior to the supercritical drying. The supercritical drying from $CO_2$ proceeds at substantially lower temperatures ($T_k$=31.1° C., $p_k$=73.9 bar).

The second method for preparing aerogels according to the prior art starts directly from alkogels [DE 18 11 353, U.S. Pat. No. 36 72 833]. To produce $SiO_2$ aerogels, a precisely measured amount of water and catalyst are added to tetramethoxysilane in methanol or in ethanol. In the hydrolysis, with elimination of alcohol, silicic acid is formed which in turn forms an $SiO_2$ gel with elimination of $H_2O$ (sol/gel process). The alkogel formed in this manner is supercritically dried in an autoclave. This method can also be used to prepare organic aerogels from melamine-formaldehyde resins and resorcinol-formaldehyde resins [U.S. Pat. No. 5,086, 085, U.S. Pat. No. 5,081, 163, U.S. Pat. No. 4,997, 804, U.S. Pat. No. 4,873, 218].

The disadvantages of supercritical drying methods are the temperature and pressure conditions and the discontinuous mode of operation. When water-containing gels are dried, temperatures of at least 370° C. and pressures of 220 bar are necessary. When methanol-containing gels are dried, temperatures of at least 240° C. and pressures of at least 81 bar are necessary. Even when the organic solvent is exchanged with $CO_2$, drying thereof proceeds at pressures of at least 74 bar and temperatures of at least 31° C. The disadvantages of supercritical drying at atmospheric pressure and with supply of heat by contactor by convection are that the resulting capillary forces lead to gel collapse. This hazard exists particularly in the case of hydrogels or lyogels having a low solids content.

In the supercritical drying technique, the gel to be dried is subjected to temperature and pressure conditions such that the critical point of the solvent used is at least achieved. In the subcritical drying technique, the gel to be dried is subjected to temperature and pressure conditions which are below the critical point of the solvent used, preferably at atmospheric pressure.

The object of the present invention was to provide a gentle drying method to produce aerogels from hydrogels (gels which occur in water) or lyogels (gels which occur in an organic solvent) which does not have the disadvantages of the known drying methods and can readily be carried out industrially.

It has been found that aerogels are produced by drying inorganic and organic hydrogels or lyogels with retention of their structure by drying the hydrogel or lyogel with dielectric drying methods. Dielectric drying methods are drying methods in which energy is supplied by electromagnetic waves, e.g. microwave drying or high-frequency drying. In high-frequency drying using radio waves, frequencies between 1 MHz and 1000 MHz are used, in microwave drying frequencies between 10$^3$ MHz and 10$^6$ MHz are employed. In the drying, the gel used, the solvent and the sample geometry must be chosen to suit exactly the energy introduced, so that an equilibrium can be established between the capillary forces and the solvent evaporating in the interior of the gel. This can be achieved, e.g. by time-pulsing or variation of the microwave power. By means of this drying method, shrinkage and crack formation in the aerogel may be substantially avoided or decisively decreased.

Hydrogels and lyogels are produced by known methods (Jeffrey Brinker, George W. Scherer, Sol/Gel Science: The physics and chemistry of sol/gel processing, Academic Press Ltd., London 1990; U.S. Pat. No. 5,081,163; U.S. Pat. No. 4,873,218; U.S. Pat. No. 4,997,804). The starting materials used are silicon compounds, aluminum compounds, melamine-formaldehyde compounds, resorcinol resins, phenol resins, aminoplastic resins, urea-formaldehyde resins and composite materials comprising one of the above described gels in combination with an industrial plastic, e.g. polystyrene or mixtures thereof.

Preferably, silicon compounds and melamine-formaldehyde compounds are used.

The gels can occur in any desired spatial form, e.g. in irregular pieces, parallelepipeds, spheres, cubes, plates and spherical particles preferably in granules, laminates and shaped pieces. The solids content is 1% by weight to 40% by weight. Laminates and shaped pieces have a thickness of 0.001 to 0.2 m, preferably 0.001 to 0.1 m, particularly preferably 0.001 to 0.05 m. Granules have a mean diameter of 0.1 to 25 mm.

The gels to be dried can be present in various industrial solvents for the dielectric drying, e.g. water; alcohols from $C_1$ to $C_8$, preferably $C_1$ to $C_4$, particularly preferably methanol, ethanol, isopropanol, isobutanol; ethers, preferably diisopropyl ether, tetrahydrofuran, dioxane, ketones, preferably acetone, cyclohexanone, and esters, preferably ethyl acetate and butyl acetate, and weakly polar solvents, such as methylene chloride or chloroform. The use of aromatic and aliphatic hydrocarbons of $C_1$ to $C_{10}$, preferably toluene; chlorofluorocarbons and fluoroalkanes as an example of nonpolar solvents is likewise feasible.

The surface tension of the solvents used can be specifically decreased by addition of ionic and nonionic surfactants at 0.1% by volume to 10% by volume and thus the dissipation of the electromagnetic energy can be increased.

It has proved to be advantageous for the inventive method if the gels to be dried are treated with a surface-modifying compound. Suitable surface-modifying compounds are those of the formula $R_xMX_y$, in which R is $C_6$–$C_{14}$-aryl or $C_1$–$C_6$-alkyl, preferably methyl or ethyl, M is Si or Al, preferably Si, X is halogen, preferably chlorine, x and y are each an integer from 1 to 3, where x and y together have a value appropriate to valency 3 or 4 of M.

The surface-modifying compound can be used in an amount 0.1 to 20% by weight, preferably 0.5 to 10% by weight, in particular 1 to 5% by weight, based on the gel. Mixtures of surface-modifying compounds can also be used.

The solvents chosen for this are preferably those which have no, or only slight, CH acidity, such as aromatic and aliphatic hydrocarbons of $C_1$ to $C_{10}$, chlorofluorocarbons, ethers, preferably diisopropyl ether, THF or dioxane, ketones, preferably acetone or cylohexanone, esters, preferably ethyl acetate or butyl acetate, and weakly polar solvents such as methylene chloride or chloroform.

If appropriate, it is expedient to exchange the solvent after the surface treatment for a polar solvent which is suitable for dielectric drying methods.

The dielectric drying may be carried out continuously or else discontinuously, using various frequencies. The frequencies used are in the high-frequency range from 1 to 1000 MHz and in the microwave range from 1000 to 1,000,000 MHz. Particular preference is given to the frequency ranges reserved by the I.C.C. (International Communication Commission) for industrial, scientific and medical applications (I.S.M.). The authorized frequencies in the high-frequency range are 13.56 MHz, 27.12 MHz and 40.68 MHz, and in the microwave range are 434 MHz, 915 MHz, 2450 MHz, 5800 MHz and 22125 MHz.

EXAMPLE 1

Preparation of a melamine-formaldehyde aerogel from the commercial product "®Madurit MW 167" (Cassella AG):

The 10% aqueous solution of the precondensate "®Madurit MW 167" is adjusted to a pH of 3.0 by addition of 50% strength sodium hydroxide solution. 1l of the adjusted solution is taken off and 76.8 g of nonylphenol polyglycol ether (®Arcopal, Hoechst AG) are added. The solution is then filtered and charged into flat vessels and sealed airtightly. The samples are kept for 7 days at 85° C. for gel formation. The samples are then taken out of the mold, neutralized and washed using 0.1% strength sodium hydroxide solution and then water.

For the subcritical microwave drying, the sample is introduced into a microwave oven. The microwave frequency is 2.450±25 MHz. The input energy is 0.1 kW per 100 g of gel. After drying, a low density of 0.3 g/cm³ is measured.

For comparative measurements, two samples are studied which are dried in air or under supercritical conditions using $CO_2$. The density of the sample dried after 4 days in air at room temperature is 0.7 g/cm³. The second comparison sample, after solvent exchange for acetone, is dried under supercritical conditions at 31° C. and 70 bar. The density of this sample is 0.2 g/cm³.

EXAMPLE 2

Preparation of a silica aerogel

In a round bottomed flask, 61 ml of TEOS (tetraethyl orthosilicate), 61 ml of ethanol, 4.87 ml of distilled water and 0.2 ml of hydrochloric acid (1 molar) are added and then refluxed for 2 h.

After cooling to room temperature, 12.7 ml of ammonium hydroxide solution (0.5 molar) are added to the sol, the sol is poured into a mold and kept for 2 h at 38° C. and then for 24 h at 50° C.

The hardened gel is removed from the mold, mechanically comminuted to fragments having a diameter of approximately 5 mm and the ethanol contained in the pores is exchanged for n-hexane. For this purpose, the sample is placed in fresh n-hexane and the n-hexane is replaced a sufficient number of times until the residual content of ethanol in the n-hexane, after equilibrium has been established, is less than 2%.

1 g of trimethylchlorosilane (TMCS) is then added to 10 g of the moist gel in 50 ml of n-hexane and the mixture is kept for 24 h at 50° C. After cooling, the reaction solution is replaced by fresh n-hexane.

The n-hexane present in the pores is exchanged for acetone. For this purpose, the gel is placed in acetone for a sufficient period and the acetone is changed a sufficient number of times until the content of n-hexane in the acetone is less than 2% after equilibrium has been established.

For the subcritical drying, granules are introduced into the microwave oven in such a manner that the acetone-moist granules can be blanketed by a nitrogen stream. The microwave frequency is 2450+/−25 MHz. The input energy is 0.2 kW per 100 ml of gel granules. After drying for 40 minutes, a density of 0.14 g/cm³ and a residual moisture of 5% acetone were measured. The volume shrinkage is 2% by volume.

For comparative measurements, a corresponding granule sample was dried for 40 minutes in air. The density after drying is accordingly 0.76 g/cm³ and the residual moisture 70% acetone. After drying for 150 minutes (residual moisture 5%), the volume shrinkage is 15%.

We claim:

1. A method for preparing aerogels by subcritical drying of organic hydrogels and lyogels to give aerogels, which comprises using dielectric drying methods.

2. The process as claimed in claim 1, wherein microwave drying or high-frequency drying is used for the dielectric drying.

3. The process as claimed in claims 1 or 2, wherein hydrogels in the form of granules, laminates and shaped pieces are dried.

4. The process as claimed in claims 1, 2 or 3, wherein hydrogels or lyogels are used which are prepared from melamine-formaldehyde compounds, resorcinol resins, phenol resins, aminoplastic resins, urea-formaldehyde resins or composite materials or mixtures thereof.

* * * * *